United States Patent
Hildner et al.

(10) Patent No.: US 11,619,392 B2
(45) Date of Patent: Apr. 4, 2023

(54) MONITORING DEVICE FOR HOUSEHOLD APPLIANCES AND HOLDING DEVICE

(71) Applicant: ELECTROLUX APPLIANCES AKTIEBOLAG, Stockholm (SE)

(72) Inventors: Dietmar Hildner, Rothenberg ob der Tauber (DE); Branko Ivanovic, Rothenberg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 908 days.

(21) Appl. No.: 16/347,958

(22) PCT Filed: Nov. 10, 2017

(86) PCT No.: PCT/EP2017/078902
§ 371 (c)(1),
(2) Date: May 7, 2019

(87) PCT Pub. No.: WO2018/091369
PCT Pub. Date: May 24, 2018

(65) Prior Publication Data
US 2019/0277509 A1    Sep. 12, 2019

(30) Foreign Application Priority Data
Nov. 15, 2016 (EP) .................................... 16198854

(51) Int. Cl.
*F16M 11/00* (2006.01)
*F24C 7/08* (2006.01)
(Continued)

(52) U.S. Cl.
CPC ............ *F24C 7/082* (2013.01); *F16M 11/041* (2013.01); *F16M 13/022* (2013.01); *F24C 7/08* (2013.01)

(58) Field of Classification Search
CPC ......... F24C 7/082; F24C 7/08; F16M 11/041; F16M 13/022
See application file for complete search history.

(56) References Cited

U.S. PATENT DOCUMENTS

2005/0092877 A1    5/2005  Carnevali
2011/0134413 A1*   6/2011  Has ........................ F24C 7/082
                                                     356/51
(Continued)

FOREIGN PATENT DOCUMENTS

DE    102013206340 A1    10/2014
EP        2515044 A1    10/2012
WO     2015185211 A2    12/2015

OTHER PUBLICATIONS

International Search Report and Written Opinion in PCT/EP2017/078902 dated Feb. 15, 2018, 12 pages.

*Primary Examiner* — Amy J. Sterling
(74) *Attorney, Agent, or Firm* — Pearne & Gordon LLP

(57) ABSTRACT

Monitoring device (3, 3.1, 3.2, 3.3) for household appliances, preferably for cooking appliances, comprising: —a housing (33), —at least one camera objective (1, 1.1, 1.2), —at least one fixation unit (2, 2.1, 2.2, 2.3), wherein the fixation unit (2, 2.1, 2.2, 2.3) is adapted for the fastening, preferably for the releasable fastening, the monitoring device (3, 3.1, 3.2, 3.3) on at least one predetermined surface area (34) of at least one predetermined model of a household appliance, and wherein the fixation unit (2, 2.1, 2.2, 2.3) is arranged relative to the camera objective (1, 1.1, 1.2) in order to arrange the camera objective (1, 1.1, 1.2), in a mounted state of the monitoring device (3, 3.1, 3.2, 3.3) on the household appliance, in at least one position of a predetermined distance (d) and/or in a predetermined orientation (α) relative to a predetermined monitoring region (32) of the household appliance.

16 Claims, 7 Drawing Sheets

Figure 1:
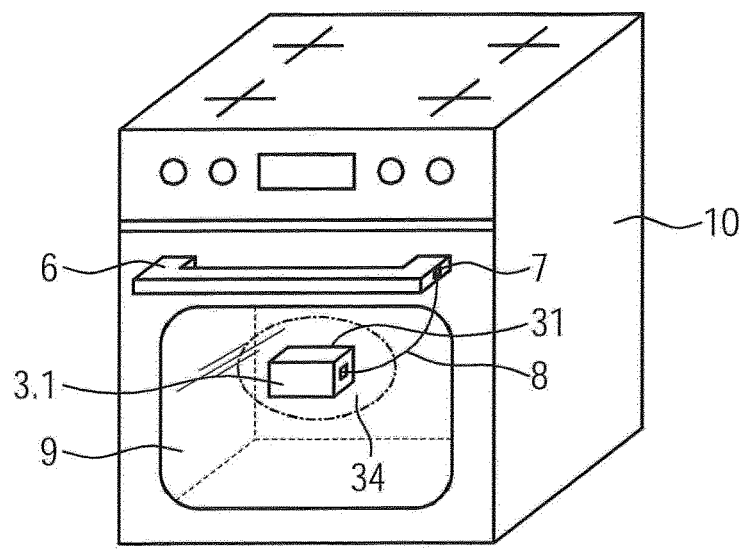

(51) Int. Cl.
*F16M 11/04* (2006.01)
*F16M 13/02* (2006.01)

(56) References Cited

U.S. PATENT DOCUMENTS

| | | | | |
|---|---|---|---|---|
| 2016/0123600 | A1* | 5/2016 | Phillips | F24C 7/082 |
| | | | | 99/337 |
| 2017/0367151 | A1* | 12/2017 | Rafii | H05B 6/1218 |
| 2019/0089872 | A1* | 3/2019 | Rukes | G03B 17/55 |
| 2021/0360203 | A1* | 11/2021 | Bauer | H04N 5/91 |
| 2021/0386239 | A1* | 12/2021 | Eiter | G01K 13/00 |
| 2022/0030677 | A1* | 1/2022 | Kuchler | A23L 5/15 |
| 2022/0065536 | A1* | 3/2022 | Beckmann | F24C 7/08 |

\* cited by examiner

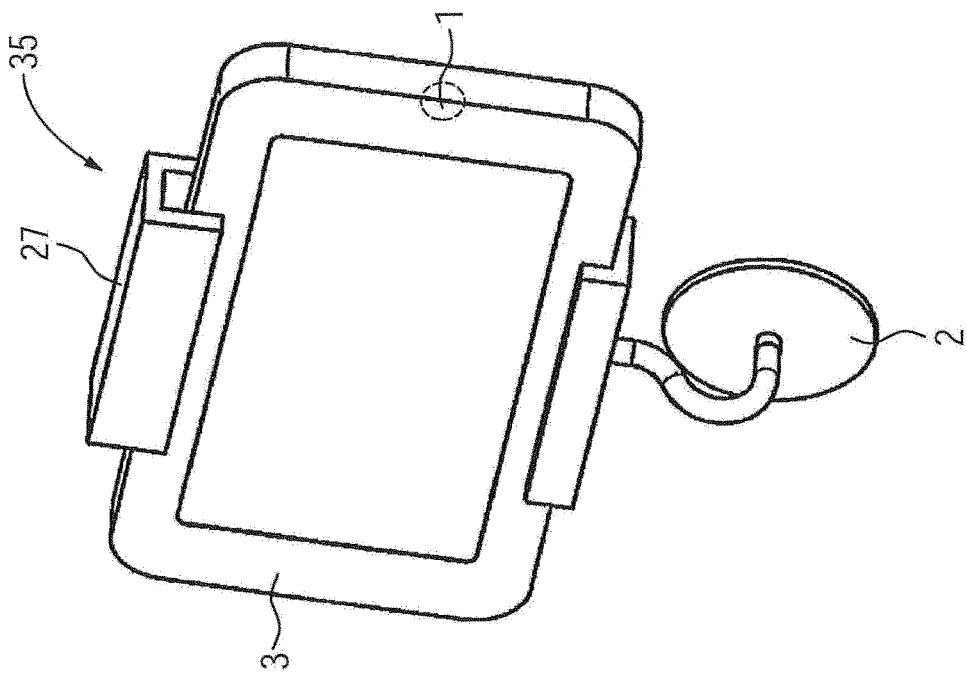
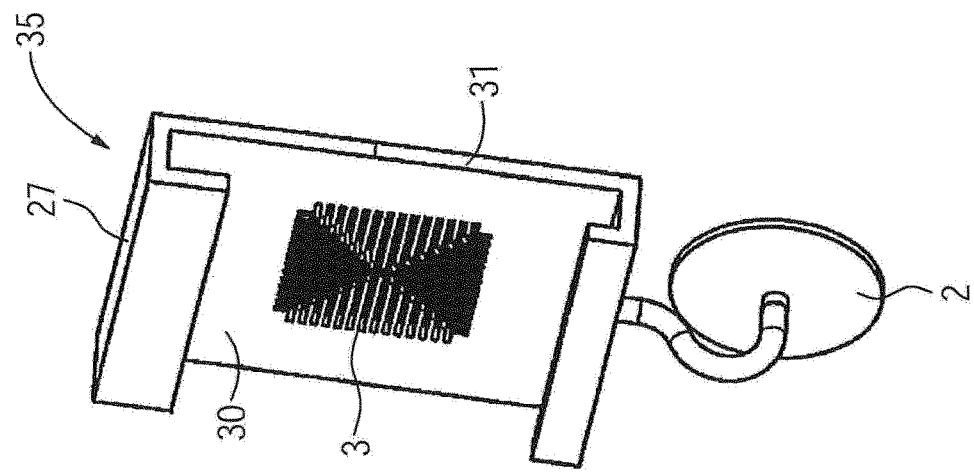
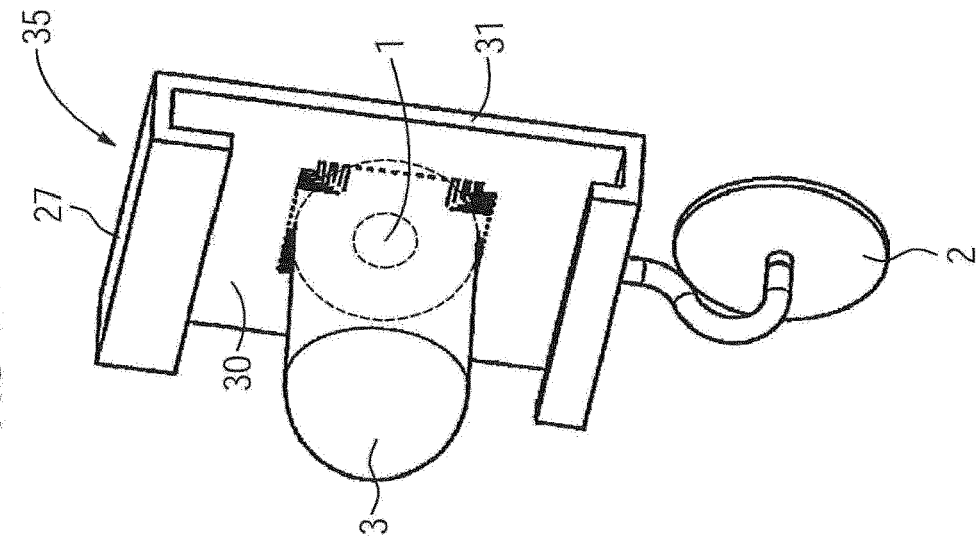

MONITORING DEVICE FOR HOUSEHOLD APPLIANCES AND HOLDING DEVICE

The present invention relates to a monitoring device for household appliances and to a holding device adapted for fastening at least one predetermined model of a monitoring device on at least one predetermined surface area of at least one predetermined model of a household appliance.

It is known to use monitoring devices like cameras inside or outside of household appliances. It is possible to transfer a live feed of a cooking process in an oven to a mobile device like a tablet or a smartphone of a user, that he can have an overview of the food even if he is in another room of his home. For such a purpose monitoring devices can be usually integrated within an oven, in the door, in the door handle or on a cooking hood. The biggest disadvantage of such solutions is that they are very expensive and very often not easy to maintain, too. Further, a customer is not able to upgrade his current (older) appliances with such devices and therefore has to buy a new product if he wants these integrated features.

Furthermore, a lot of new domestic appliances are increasingly being upgraded or developed to include Wi-Fi or WLAN connectivity so that they can connect to the internet and exchange information with home owners' smartphones or computers. Connectivity, whether through NFC, Bluetooth or Wi-Fi gives users more precise and more flexible controls.

For example, some ovens already comprise USB interfaces integrated into a door handle or a panel. Also, Wi-Fi modules and/or USB interfaces on cooker hoods are also well-known features. Owning such devices, a customer may like to have a possibility to upgrade them with a monitoring device too without having the need to replace the whole appliance.

However, it is quite difficult to find an appropriate spot for placing a monitoring device in an appliance due to temperature, cooling, constructive or other reasons like a pyrolysis function. Therefore, a good place for having the best view on the area to be monitored is complex to find, in particular for an ordinary person without specific knowledge.

It is furthermore difficult that a built-in antenna in a monitoring device provides a good signal with respect to the installed position of the module and its orientation. For example, if there is a (metal) cabinet between a router and a WI-FI module and its antenna, it may be impossible that a wireless signal will be received. Also, almost all household appliances are installed closed to each other and if they are each equipped with single WI-FI modules this will also obstruct the signals. All known appliances comprising monitoring devices with Wi-Fi modules placing them within the appliances, which may cause problems in the receiving of the signals, too.

It is an object of the present invention to overcome the above mentioned drawbacks and to provide an improved monitoring device for domestic appliances.

According to the present invention a monitoring device for household appliances, preferably for cooking appliances, comprises:
 a housing,
 at least one camera objective,
 at least one fixing unit,
wherein the fixation unit is adapted for the fastening, preferably for the releasable fastening, of the monitoring device on at least one predetermined surface area of at least one predetermined model of a household appliance, and
wherein the fixation unit is arranged relative to the camera objective in order to arrange the camera objective, in a mounted state of the monitoring device on the household appliance, in at least one position of a predetermined distance and/or in a predetermined orientation relative to a predetermined monitoring region of the household appliance.

A central idea of the present invention is that a user can releasable fix a monitoring device (like a camera) on the front of an appliance in the best position for monitoring an area (in particular a cooking area like the cavity of a cooker) so that it is possible to transfer images or videos from the monitoring device to e.g. a smartphone, a tablet or a PC of user. Therefore, the user is able to watch the cooking process from another room and have the chance to influence the process via apps or programs, which are in conjunction with oven controls. For having the best view, a monitoring device may be placed by the user close to the oven glass at the best possible position (e.g. the middle of the oven glass) for monitoring the inside of the oven. In that case, sunlight reflections from the oven glass may be blocked and therefore cannot reach the camera objective, ghosting and flares can be almost completely eliminated. The usage of high-quality objectives or lenses with multi-coated lens elements can thus be avoided.

The household appliance may be (or include) a cooking oven, a cooking hob, a fridge, a wine cooler, a freezer, a laundry washer, a tumble dryer, a dishwasher, or a similar appliance.

However, the present invention relates in particular to the field of household appliances like cooker, oven, cooker hoods and the like with a wireless camera unit, which can be releasable fixed on the outer surface of said household appliances and which can be directly connected to the said appliance by a communication device. The camera module can be placed at or on the outer part of an appliance or furniture and not inside of them to provide the best overall signals and not having the need to consider temperature or cooling issues. It is possible to use a usually camera for the monitoring. A specific and/or integrated (expensive) camera is not necessary, but possible to use, too.

According to the present invention, a holding device adapted for fastening at least one predetermined model of a monitoring device on at least one predetermined surface area of at least one predetermined model of a household appliance, preferably a cooking appliance,
wherein the monitoring device comprises a housing and at least one camera objective,
wherein the holding device comprises at least one fastening unit for the fastening,
preferably for the releasable fastening, of the monitoring device on the holding device,
wherein the holding device comprises at least one fixation unit for the fastening,
preferably for the releasable fastening, of the holding device on at least one predetermined surface area of the household appliance,
wherein the fastening unit is adapted for arranging at least one camera objective of the monitoring device, in a mounted state of the monitoring device on the household appliance, in at least one position of a predetermined distance and/or in a predetermined orientation relative to a predetermined monitoring region of the household appliance.

Via such a holding device it is possible to use the monitoring device on different kinds of domestic appliances without the need of an extensive positioning, in particular regarding the correct angle, which the holding already shows. For example, it is possible to use the monitoring device on an angled glass cooker to enable a monitoring of the cooking hob. The monitoring device can be easy fixed and released on the holding device. The holding device always enables the best place for monitoring by an easy positioning of the monitoring device.

According to another aspect of the invention, the monitoring device or holding device comprises an orienting section for the camera objective, wherein the orienting section is arranged relative to the fixation unit in order to arrange the camera objective relative to the household appliance and/or wherein the orienting section is, in a mounted state of the monitoring device on the household appliance, arranged such that it is facing the predetermined monitoring region of the household appliance. An appropriate positioning of the monitoring device and therefore the camera objective is therefore easily possible. The orienting section may be arranged on the same side of the camera objective and/or the fixation units. However, it may possible to arrange the orienting section on the opposite side of the fixation units. The orienting section is always arranged on the side of the monitoring device with faces the monitoring section.

In particular, the at least one fixation unit is magnetic and/or is a suction cup, in particular a microscopic suction cup, and/or is a micro suction foam and/or is a hook and loop fastener, preferably wherein the fixation unit is or comprise a suction cup which especially comprises an integrated camera objective, and wherein in particular the surface of the household appliance comprises the fixation unit and/or wherein the monitoring device comprises the fixation unit or fixation means able to interact with the fixation unit. A very fast fixation of a monitoring device is therefore possible. The monitoring device can be placed very easy and directly on each position of an e.g. transparent oven pane and may provide a view directly inside the oven. By the above mentioned examples of fixations it is possible to attach a monitoring device on any solid and flat surfaces. If the fixation unit gets dirty it is easy to clean it by washing it with water. Further, maintenance of the fixation unit is always simple. The fixation unit may be a pad arranged on at least one place of the monitoring device or it may be arranged on one whole surface of the device. It is also possible to use a suction cup with an integrated camera objective to enable the positioning of the camera module in different angles by rotating the monitoring device and still be able to monitor an area through the included camera objective.

Further, the monitoring device comprises at least one flap, which is in particular arranged and/or can be arranged in a region near the at least one camera objective, especially arranged such that the flap can cover the camera objective and/or wherein the at least one flap and/or the fixation unit is at least partially rotatable or pivotable.

Advantageously, a flap covers the monitoring device and/or the camera against dirt, dust and the like. The flap may be consisting of a plastic or silicone material. The flap may include a fixation unit and may be removable from the monitoring device by a swing opening. It is therefore possible to place the monitoring device in a flexible way on the appliance in different angles.

Preferably, the flap comprises a protection lens, which is at least partially transparent. With a protection lens, which may be for example a transparent window made out of plastic, it is possible to protect the camera objective from dirt and dust. It is also possible to use the monitoring device without removing the flap (when it is transparent). It is further possible to make the whole flap from a transparent material.

Moreover, the monitoring device comprises at least one cover, which covers at least partially the housing of the monitoring device. The cover may protect a sticky surface of the monitoring device when the camera is not in use. When the camera is not in usage, the cover can be removed from the back side and clipped again on the surface of the monitoring device comprising the camera objective for the protection of the camera objective and/or the fixation unit. The cover may be e.g. made out of plastic or silicone material.

Preferably, the at least one cover comprises at least one fixation unit. The cover may comprise an own fixation unit and it can be easy removed from the camera objective side and clipped on the back side of a housing of the monitoring device.

Furthermore, the monitoring device comprises a communication device, which comprises a USB interface for wired communication and/or comprises wireless communication devices, in particular a Wi-Fi antenna and/or wherein the communication device comprises and/or is in conjunction, preferably in optical conjunction, with a camera unit, which is at least partially in conjunction, preferably in optical conjunction, with the at least one camera objective and/or wherein the camera unit comprises a recording device which is preferable aligned concentric to an axis, preferably an optical axis of the camera objective. It is possible to connect the monitoring device e.g. via an USB cable to an external device or to the domestic appliance. The USB interface may be able to receive e.g. type A, B, mini or micro plugs. It can be connected to e.g. a door handle, a front glass or a front panel of a domestic appliance and it can also be directly connected to the control unit of the appliance. The wireless communication devices may be a Wi-Fi antenna and may be arranged near or on the front side and/or the back side of the monitoring device. It allows the user to view and record audio and video wirelessly on their PC or smart phones. The wireless communication devices may include an e.g. 802.11a/b/g/n/ac wireless (Wi-Fi) interface and/or Bluetooth technology which allows to stream and record audio and video images by mobile devices such as smart phones and laptops. Furthermore, operators can use a standard web browser to connect to the monitoring device for viewing, recording or taking snap shots. It can also be controlled by means of different applications which allow detecting a preview multiple monitoring devices connected to the local area network (LAN).

Further, the monitoring device comprises a rechargeable unit. This may be a lithium or polymer or lithium ion rechargeable battery.

In particular, the rechargeable unit is rechargeable by at least one inductive coil and/or by the USB interface of the communication device and/or a power plug-in connector. The monitoring device may comprise an inductive coil for wireless charging of the rechargeable unit. As some household appliances already comprise inductive power supply coils for powering e.g. mobile devices, they can be used for wireless charging the rechargeable unit of the monitoring device, too. The rechargeable unit can be further plugged via any Mini USB cable into a USB port on one side and into e.g. a JST plug on the other side. Furthermore, it is possible to connect the monitoring unit to a power plug-in of the household.

According to an aspect of the invention, the monitoring device comprises an indicator, in particular at least one LED.

The monitoring device may comprise one or more LED for indicating a status of the charging process. While charging, e.g. a red LED may light. When the battery is fully charged and ready for use, the green LED turns on.

Preferably, two camera objectives are arranged within a housing of the monitoring device, wherein the flap can be removed from one camera objective and can be fastened to the second camera objective. The housing may comprise two cameras and two camera objectives on opposite sides for a flexible positioning of the monitoring device.

In particular, the flap can be removed from one camera objective and can be fastened to the second camera objective. Thus, it is possible to cover the second camera objective during the use of the first one.

Furthermore, the orienting section arranges the camera objective within the predetermined distance and/or within an angle relative to the monitoring region of the household appliance. It therefore can be managed for the perfect settings of the focus and/or the right angle of the camera objective in order to achieve the best images of the monitoring region. It is therefore possible to establish an automatic calibration of the camera objective.

Advantageously, the fastening section of the holding device comprises the fastening unit for receiving and/or holding the monitoring device.

In particular, the fastening unit is adapted for a releasable fixation of at least one predetermined model of monitoring device in particular of a smartphone, tablet computer, digital camera, or the like. It is therefore possible for the user to take his present devices for the monitoring of the appliance.

Further, the monitoring device or the camera unit respectively may also include a megapixel sensor (e.g. 8 MP), an autofocus camera objective (or lens), a flasher, an internal memory (e.g. 4 GB), a microphone for touchless remote, an ON/OFF or reset switch and an accelerometer sensor.

The monitoring device or the camera unit may also comprise features for double exposure, burst mode, time-lapse sequences, video recording, and GIF creation.

An aforementioned monitoring device may comprised by a household appliance like a cooking oven, a cooking hob, a fridge, a wine cooler, a freezer, a laundry washer, a tumble dryer, a dishwasher, or a similar appliance.

Figure 2:
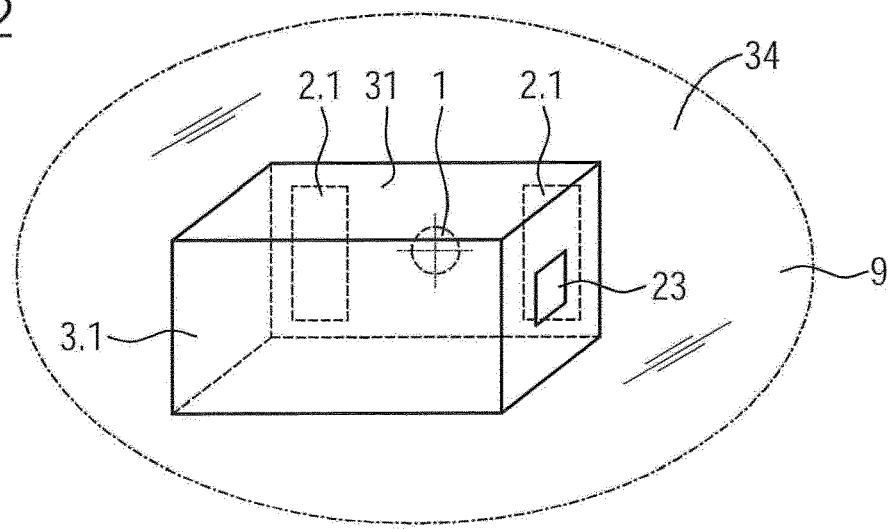
Figure 3:
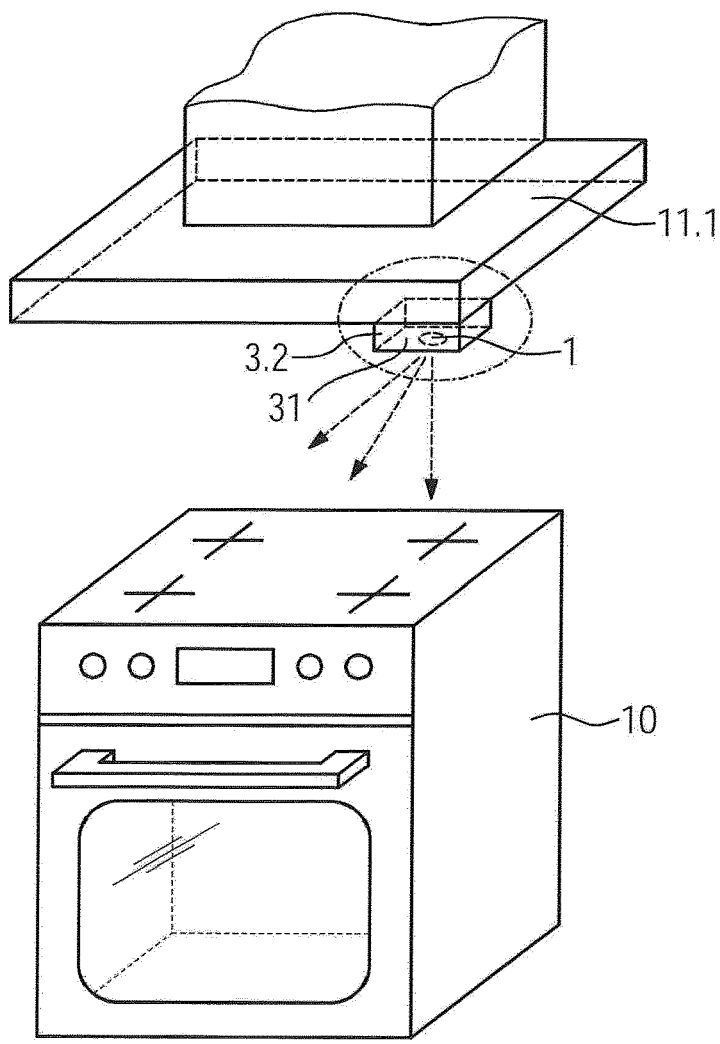
Figure 4:
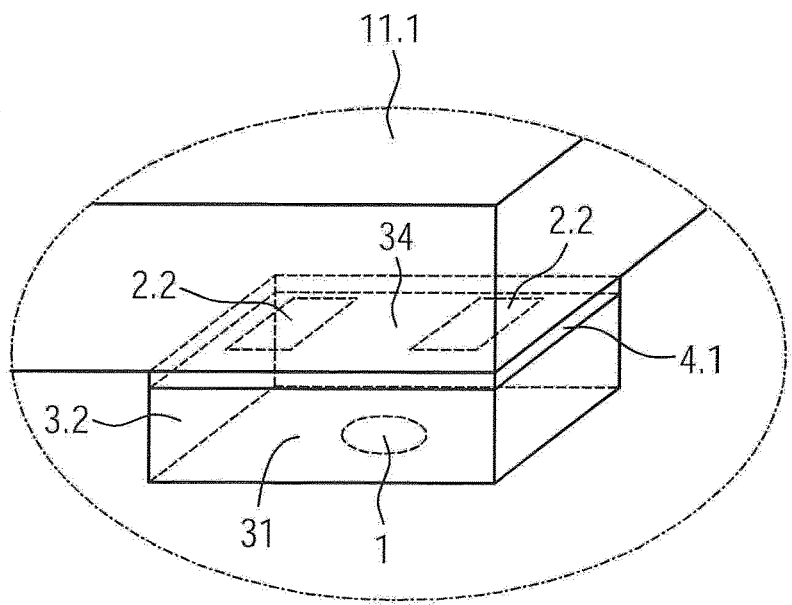
Figure 5:
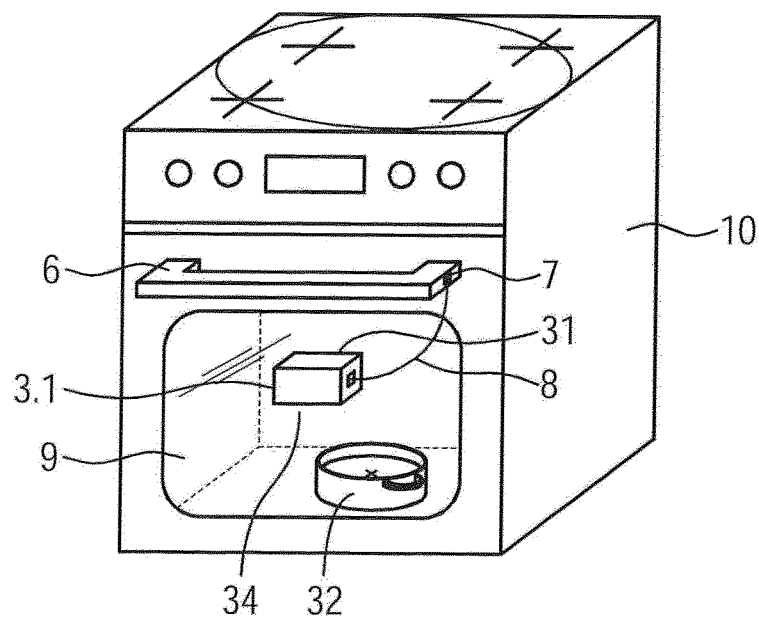
Figure 6:
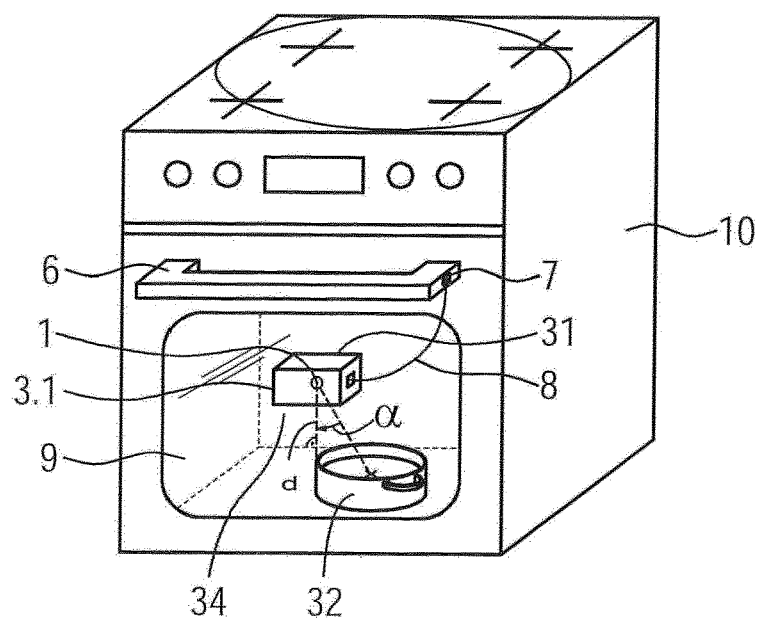
Figure 7:
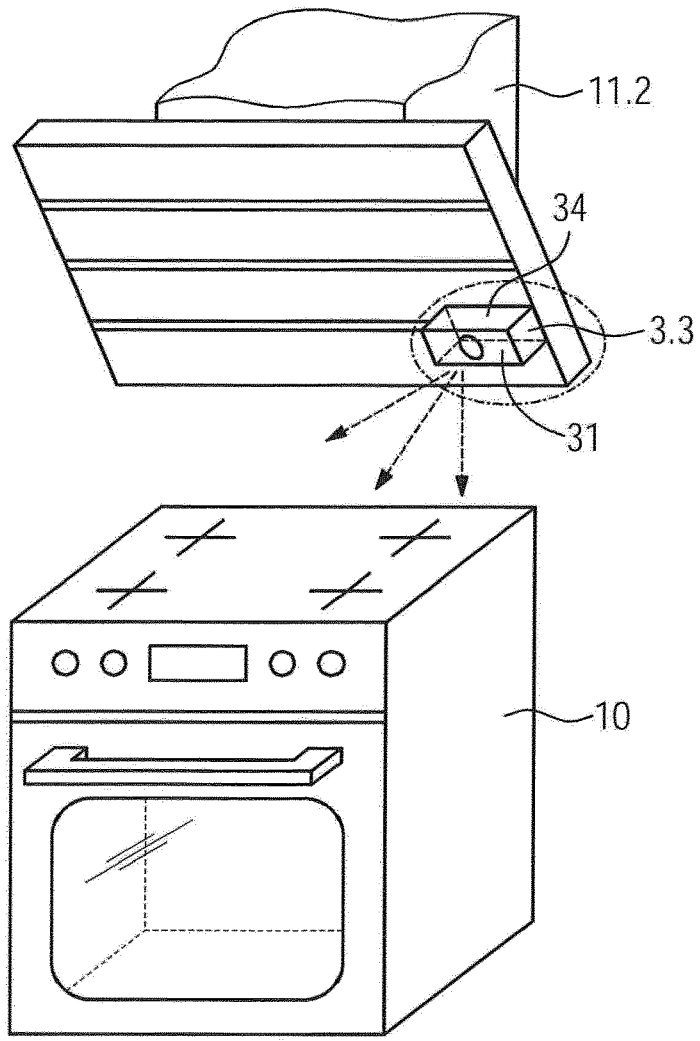
Figure 8:
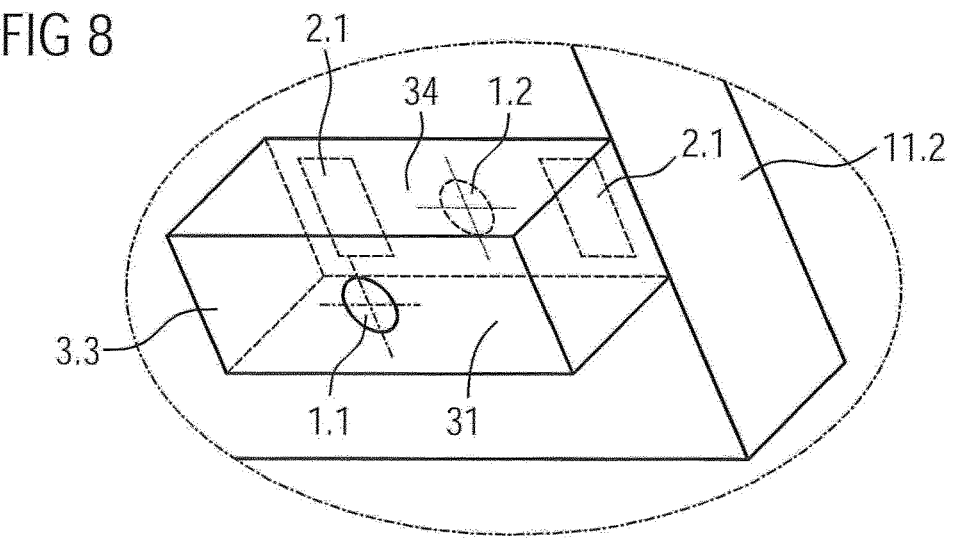
Figure 9:
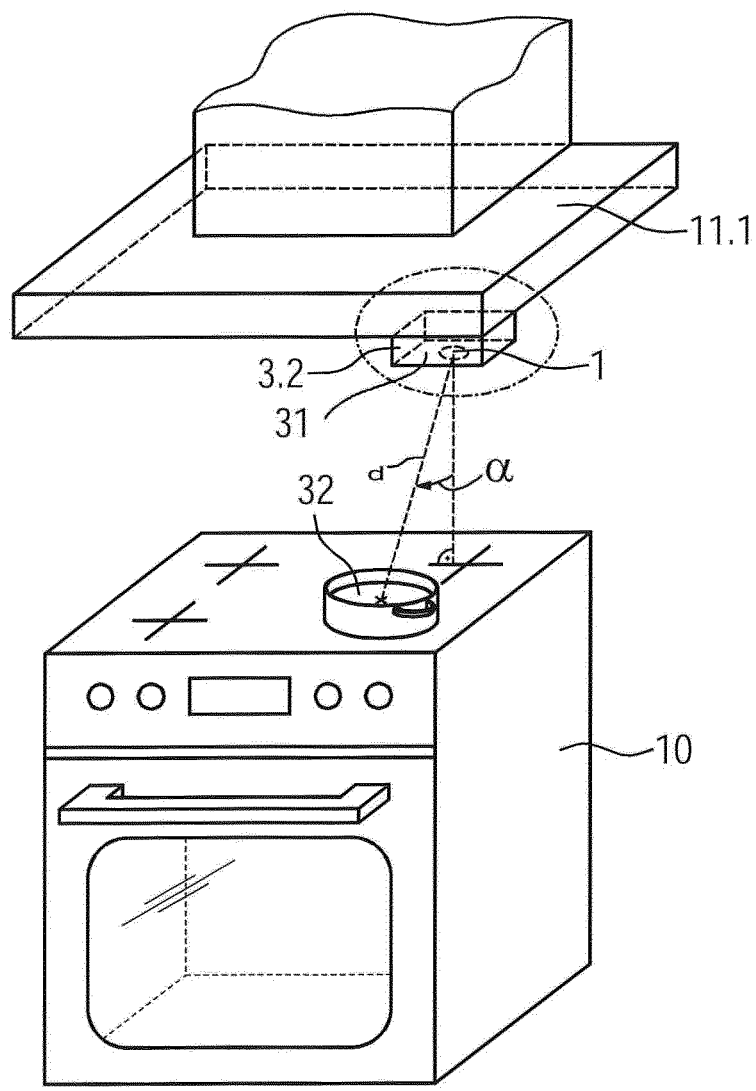
Figure 10:
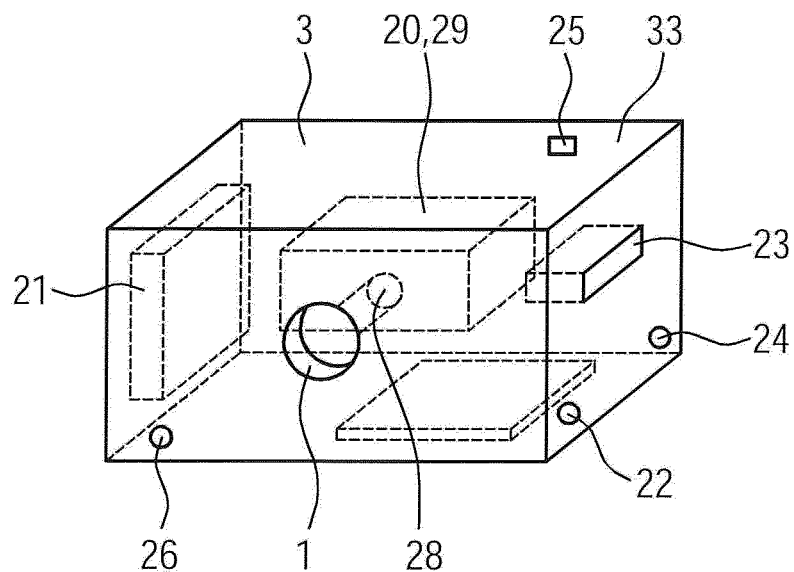
Figure 11:
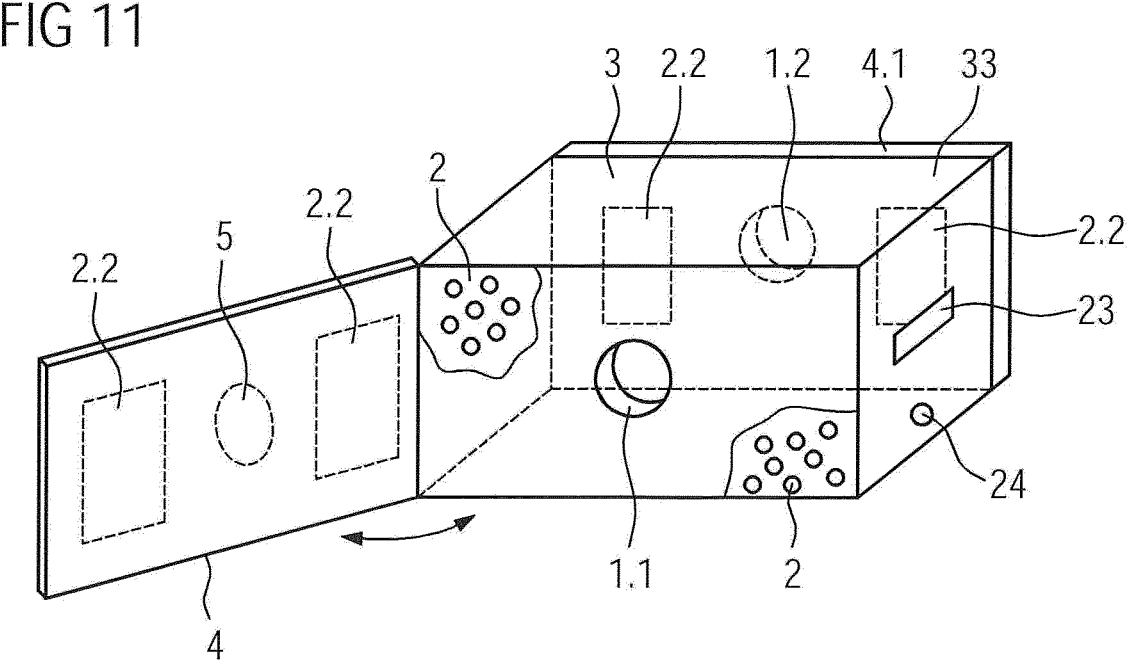

The present invention will be described in further detail with reference to the drawing, in which FIG. 1 illustrates a schematic perspective view of a cooking device with a monitoring device on the front glass according to a preferred embodiment of the present invention, FIG. 2 illustrates a schematic detailed perspective view according to the preferred embodiment of the present invention, FIG. 3 illustrates a schematic perspective view of a metal cooker hood with a monitoring device according to another preferred embodiment of the present invention, FIG. 4 illustrates a schematic detailed perspective view of the cooker hood with a monitoring device according to the preferred embodiment of the present invention, FIG. 5 illustrates a schematic perspective view of a cooking device with a monitoring device according to another preferred embodiment of the present invention, FIG. 6 illustrates a schematic perspective view of the a cooking device with a monitoring device according to another preferred embodiment of the present invention, FIG. 7 illustrates a schematic perspective view of a glass cooker hood with a monitoring device according to another preferred embodiment of the present invention, FIG. 8 illustrates a schematic detailed perspective view of the glass cooker hood according to the preferred embodiment of the present invention, FIG. 9 illustrates a schematic detailed perspective view of the glass cooker hood according to the preferred embodiment of the present invention, FIG. 10 illustrates a schematic perspective view of a monitoring device according to a preferred embodiment of the present invention, FIG. 11 illustrates a schematic perspective view of a monitoring device with a flap according to a preferred embodiment of the present invention, FIG. 12 to FIG. 14 illustrate holding devices for several types of monitoring devices.

FIG. 1 illustrates a schematic perspective view of a cooker 10 with a monitoring device 3.1 on the front glass according to a preferred embodiment of the present invention. This example refers to a cooker 10 comprising a door handle 6. The monitoring device 3.1 is arranged on a (at least partially transparent) surface area 34 of the household, which is a glass panel 9 in this example. As it can be seen more detailed in FIG. 2, the monitoring device 3.1 comprises two fixation units 2.1, wherein a orienting section 31 is arranged relative to the fixation unit 2.1 in order to arrange the camera objective relative to the household appliance. Further, the orienting section 31 is, in a mounted state of the monitoring device 3.1 on the household appliance, arranged such that it is facing the predetermined monitoring region 32 of the household appliance. The orientation area 31 may be on the same side as the fixation units 2.1 or on the other side. The positioning of the fixation units 2.1 is variable and not bound to the showed position. The fixation unit(s) 2.1 may be a magnetic strips or a suction cup, a microscopic suction cup or micro suction foam or a hook and loop fastener (in this case with a respective counterpart on the appliance) for a flexible and easy fastening of the monitoring device 3.1 on the appliance. Referring to this embodiment, the fixation unit 2.1 is a micro suction foam for arranging the monitoring device 3.1 on the glass panel 9. By the suction foam, the monitoring device 3.1 is rotatable and it is therefore possible to arrange the device in different angles on the glass 9. In such position, the monitoring device can monitor the inside of the cooker 10 using the camera objective 1, which is arranged directly toward the oven glass 9. The monitoring device further comprises a communication device 23, e.g. an USB interface, which is connectable to an USB interface 7 on the door handle 6 for the communication or power supply via an USB-cable 8.

FIG. 3 illustrates a schematic perspective view of a metal cooker hood 11.1 with a monitoring device 3.2 according to another preferred embodiment of the present invention. The metal cooker hood 11.1 is arranged above a cooker 10 and comprises a monitoring device 3.2 on its underpart on the surface area 34 of the household appliance. By the orientation section 31, it is possible to arrange or positioning the monitoring device 3.2 with the camera objective 1 relative to the cooking appliance 10. As it can be seen in FIG. 4, the camera objective 1 is arranged on the opposite side of the monitoring device 3.2 in relation to the metal cooker hood 11.1. It is therefore possible to monitor the hob of the cooker 10. For example, a pot may be placed on the hob and the monitoring device 3.2 is arranged directly above the pot or in similar positions to monitor the cooking process in the pot. A user may receive the video signals from the monitoring device 3.2 and hence has an overview of the status of the food. The monitoring device 3.2 is releasable fixed on the metal cooker in the surface area 34 hood 11.1 by two fixation units 2.2. As it is also showed in FIG. 4, the monitoring device 3.2 may comprise a cover 4.1, which may be clipped on or off to the monitoring device 3.2 and may cover the monitoring device 3.2 against dirt, dust and the like. The cover 4.1 may also include or comprise a fixation unit 2.2.

FIGS. 5 and 6 illustrate schematic perspective views of a cooking device 10 with a monitoring device according to another preferred embodiment of the present invention. In this example, the monitoring device 3.1 is arranged on the glass panel 9 on a surface area 34 by an orienting section 31. By this orienting section 31, it is possible to arrange the monitor device relative to a monitoring region 32, which is a pan or the like. The monitoring device 3.1 is arranged such that is positionable by the orienting section 31 on a position on a distance d between the monitoring region 32 and the monitoring device 3.1. Further it is arranged such that is positionable by the orienting section 31 on a position on an angle (α) between the monitoring region 32 and the monitoring device 3.1. By that it is possible to align the camera objective 1 in the best way, in a correct distance and a correct angle for an adequate monitoring of the monitoring region 32 and therefore of the pan.

FIG. 7 illustrates a schematic perspective view of a glass cooker hood 11.2 with a monitoring device 3.3 according to another preferred embodiment of the present invention. According in particular to FIG. 8, the structure of the monitoring device 3.3 is similar to the embodiment 3.2 in FIGS. 3 and 4. However, the monitoring device 3.3 is arranged on the cooker hood 11.2 on a surface area 34 in such an angle that it is aligned perfectly to the cooking hob of the cooker 10 for monitoring placed cooking pots. For fast positioning of the monitoring device 3.3, it may comprise two camera objectives (or lenses) 1.1 and 1.2 on the front and the back side of the monitoring device 3.3, so it is possible to use both sides of the device when fixing it on a surface.

FIG. 9 illustrates a schematic detailed perspective view of the glass cooker hood according to the preferred embodiment of the present invention. In this example, the monitoring device 3.2 is arranged on the cooker hood 11.1 by an orienting section 31. By this orienting section 31, it is possible to arrange the monitor device relative to a monitoring region 32, which is in this example a pan or the like on a cooking hob 10. The monitoring device 3.2 is arranged such that is positionable by the orienting section 31 on a position on a distance d between the monitoring region 32 and the monitoring device 3.2. Further it is arranged such that is positionable by the orienting section 31 on a position on an angle (α) between the monitoring region 32 and the monitoring device 3.2. By that it is possible to align the camera objective 1 in the best way for monitoring the monitoring region 32 and therefore the pan with the foodstuff.

FIG. 10 illustrates a schematic perspective view of a monitoring device 3 according to a preferred embodiment of the present invention. The monitoring device 3 comprises within a housing 33 communication devices 20, 23, which may be a USB-interface or a Wi-Fi antenna and a camera unit 29. A recording device 28 is in conjunction with the camera objective 1 for monitoring the area to be monitored. The monitoring device 3 comprises further a rechargeable unit 21 (e.g. a battery or akku) which may be rechargeable via a power plug-in connector or the USB-interface. Further, it is possible to recharge the rechargeable unit 21 wireless via an inductive coil 22. An external inductive coil of the domestic appliance may be used for this kind of recharging.

An indicator 26, preferably one or more LED, is also comprised by the monitoring device 3 to indicate the status of the rechargeable unit 21 or the charging status. The monitoring device 3 may be switched on and of a by a switch 25.

FIG. 11 illustrates further a schematic perspective view of a monitoring device 3 with a flap 4 according to a preferred embodiment of the present invention. Also, a cover 4.1 is comprised by the monitoring device 3 in this embodiment. The flap 4 is releasable from the monitoring device 3 via swing opening and covers the camera objective 1 against dirt or the like. The flap 4 may comprise a protection lens 5, which is preferable transparent (e.g. glass or transparent plastics). Therefore it is possible to use the cover of the flap 4 while monitoring by the front side camera objective 1.1. In this embodiment, the fixation unit 2 is a micro suction pad, which is arranged on the front side of the monitoring device 3. The fixation unit 2 is also covered by the flap 4, which has own fixation units 2.2 for the fixation of the monitoring device 3 on the surface area 34. The cover 4.1 is fixed on the backside of the monitoring device 3 while it is in use. After use, the cover 4.1 can be e.g. fixed on the front side for a covering of the camera objective 1.

FIGS. 12 to 14 show holding devices 35 for several types of monitoring devices. It is possible to use also tablets or smartphones (e.g. FIG. 14) or ai-cameras (e.g. FIG. 12, 13) or the like for the monitoring and thus there is no need for a specific monitoring device 3. For an additional fixation of the devices, a fastening 27 may be used, which is arranged on a fastening section 30, which may be a plain area. The monitoring devices 3 may be fastened on the fastening section 30, for example by fixation units 2. By the orientation section 31, the monitoring device 3 may be positioning in the correct way according in above described ways. With such holding devices, the correct position and angle is always ensured for each domestic appliance.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 1 camera objective
1.1 front side objective
1.2 back side objective
2, fixation unit
2.1, 2.2, 2.3
3, monitoring device
3.1, 3.2, 3.3
4, flap
4.1 cover
5 protection lens
6 door handle
7 USB interface
8 power cable
9 glass panel
10 cooker
11, cooker hood
11.1, 11.2
20, communication device
23

21 rechargeable unit
22 inductive coil
24 power plug-in connector
25 switch
26 indicator
27 fastening unit
28 recording device
29 camera unit
30 fastening section
31 orienting section
32 monitoring region
33 housing (of camera)
34 surface area (of the household appliance)
35 holding device
d distance
α orientation

The invention claimed is:

1. Monitoring device for household appliances, comprising:
a housing,
a camera objective, and
a fixation unit,
wherein the fixation unit is adapted to releasably fasten the monitoring device to a user-selected location selected from among a plurality of available user-selectable locations on a predetermined surface area of a predetermined model of a household appliance, the predetermined surface area being an outer surface of a cooking hood, wherein the fixation unit is magnetic, is a suction cup, is a micro suction foam, is a hook and loop fastener, or a combination thereof, and wherein the fixation unit is arranged relative to the camera objective in order to arrange the camera objective, in a mounted state of the monitoring device on the household appliance, at a predetermined distance, in a predetermined orientation, or both, relative to a predetermined monitoring region of the household appliance wherein food is resident and being cooked in order to monitor the progress thereof via said camera objective.

2. Holding device adapted to releasably fasten a predetermined model of a monitoring device to a user-selected location selected from among a plurality of available user-selectable locations on a predetermined surface area of a predetermined model of a household appliance, the predetermined surface area being an outer surface of a cooking hood, wherein the monitoring device comprises a housing and a camera objective, wherein the holding device comprises a fastening unit for the releasable fastening of the monitoring device on the holding device, wherein the holding device comprises a fixation unit for the releasable fastening of the holding device on a predetermined surface area of the household appliance, wherein the fixation unit is magnetic, is a suction cup, is a micro suction foam, is a hook and loop fastener, or a combination thereof, wherein the fastening unit is adapted for arranging the camera objective of the monitoring device, in a mounted state of the monitoring device on the household appliance, at a predetermined distance, in a predetermined orientation, or both, relative to a predetermined monitoring region of the household appliance wherein food is resident and being cooked in order to monitor the progress thereof via said camera objective.

3. Monitoring device according to claim 1, comprising an orienting section for the camera objective, wherein the orienting section is arranged relative to the fixation unit in order to arrange the camera objective relative to the household appliance, and wherein the orienting section is, in a mounted state of the monitoring device on the household appliance, arranged such that it is facing the predetermined monitoring region of the household appliance.

4. Monitoring device according to claim 1, wherein the predetermined surface area of the household appliance comprises the fixation unit and wherein the monitoring device comprises the fixation unit or fixation means able to interact with the fixation unit.

5. Monitoring device according to claim 1, further comprising a flap arranged in a region near the camera objective, such that the flap can cover the camera objective, wherein the flap and/or the fixation unit is at least partially rotatable or pivotable.

6. The monitoring device according to claim 5, wherein the flap comprises a protection lens, which is at least partially transparent.

7. Monitoring device according to claim 1, wherein the monitoring device comprises a cover, which covers at least partially the housing of the monitoring device, wherein the cover comprises the fixation unit.

8. Monitoring device according to claim 1, further comprising a communication device, which comprises a USB interface for wired communication or a Wi-Fi antenna, wherein the communication device comprises or is in optical conjunction with a camera unit, which is in at least partially in optical conjunction with the at least one camera objective, wherein the camera unit comprises a recording device aligned concentric to an optical axis of the camera objective.

9. Monitoring device according to claim 1, further comprising a rechargeable unit that is rechargeable by at least one inductive coil, by the USB interface of a communication device, or by a power plug-in connector.

10. Monitoring device according to claim 1, further comprising an LED indicator.

11. Monitoring device according to claim 1, wherein two camera objectives are arranged within said housing.

12. Monitoring device according to claim 11, further comprising a flap that can cover the two camera objectives, wherein the flap can be removed from one of said two camera objectives and can be fastened to the second of said two camera objectives.

13. Monitoring device according to claim 3, wherein the orienting section arranges the camera objective within the predetermined distance and within an angle (α) relative to the monitoring region of the household appliance.

14. Holding device according to claim 2, wherein the fastening section comprising the fastening unit for receiving and holding the monitoring device, wherein the fastening unit is adapted for a releasable fixation of said predetermined model of monitoring device, said monitoring device comprising a mobile device.

15. A monitoring device for monitoring the progress of cooking food using a cooking appliance, the monitoring device comprising a housing, a camera objective, a fixation unit comprising micro suction foam adapted to releasably secure the housing to a user-selected position on a surface exterior of the appliance, the surface being an outer surface of a cooking hood, an orienting section adapted to arrange said camera objective, in a mounted state of the monitoring device to said surface, relative to said cooking appliance so that said camera objective faces a user-selected monitoring region of the appliance wherein food is resident and being cooked in order to monitor the progress thereof via said camera objective, a swing-openable flap reversibly covering a surface of said housing that comprises said fixation unit and wherein said camera objective is disposed in order to protect said camera objective and said fixation unit when not in use, and a communication device within said housing and adapted to transmit a signal reflective of images captured via said camera objective to a portable electronic device of the user via a wireless network, wherein said user-selectable position of said surface and a selected configuration of said orienting section can be used to adjust both a distance and an angle between said camera objective and said monitoring region in order to achieve an optimal viewing condition across a range of different cooking appliances.

16. The monitoring device according to claim 15, further comprising a USB interface for wired communication with the cooking appliance and adapted to recharge a rechargeable battery resident within said housing.

\* \* \* \* \*